United States Patent
Knight et al.

(10) Patent No.: US 12,465,475 B2
(45) Date of Patent: Nov. 11, 2025

(54) ELASTOMERIC AUXETIC MEMBRANE FOR UROGYNECOLOGICAL AND ABDOMINAL IMPLANTATIONS

(71) Applicant: Magee-Womens Research Institute & Foundation, Pittsburgh, PA (US)

(72) Inventors: Katrina Marquita Knight, Pittsburgh, PA (US); Pamela A. Moalli, Pittsburgh, PA (US); Steven D. Abramowitch, Butler, PA (US); Ken Gall, Durham, NC (US)

(73) Assignee: Magee-Womens Research Institute & Foundation, Pittsburgh, PA (US)

( * ) Notice: Subject to any disclaimer, the term of this patent is extended or adjusted under 35 U.S.C. 154(b) by 764 days.

(21) Appl. No.: 17/573,216

(22) Filed: Jan. 11, 2022

(65) Prior Publication Data

US 2022/0218458 A1    Jul. 14, 2022

Related U.S. Application Data

(60) Provisional application No. 63/205,849, filed on Jan. 11, 2021.

(51) Int. Cl.
*A61F 2/00* (2006.01)
*A61L 27/18* (2006.01)
*A61L 27/50* (2006.01)

(52) U.S. Cl.
CPC ............ *A61F 2/0063* (2013.01); *A61L 27/18* (2013.01); *A61L 27/50* (2013.01); *A61F 2002/0068* (2013.01)

(58) Field of Classification Search
CPC ........ A61F 2/0045; A61F 2/0063; A61F 2/02; A61F 2/01; A61F 2/04; A61F 2/06;
(Continued)

(56) References Cited

U.S. PATENT DOCUMENTS 9,974,640 B2    5/2018   Hacker et al.
10,314,700 B2   6/2019   Sogard et al.
(Continued)

FOREIGN PATENT DOCUMENTS

CN    103083717 A    5/2013
EP    0461375 A1    9/1995
EP    3037061 A1    6/2016

OTHER PUBLICATIONS

"Effects of Stress Shielding on the Mechanical Properties of Rabbit Patellar Tendon" by N. Yamamoto, et al., Journal of Biomechanical Engineering, Feb. 1993, vol. 115/23.
(Continued)

*Primary Examiner* — Jocelin C Tanner
(74) *Attorney, Agent, or Firm* — Buchanan Ingersoll & Rooney PC

(57) ABSTRACT

Embodiments relate to the use of auxetic geometries to construct the pores of membranes. Auxetic geometries expand in the transverse direction when stretched along the longitudinal direction. This behavior is counterintuitive as most materials contract in the transverse direction when stretched longitudinally. A mesh with pores that are auxetic has the potential to overcome the primary limitation of most prolapse meshes—pore collapse with tensile loading.

19 Claims, 21 Drawing Sheets

(58) Field of Classification Search
CPC ........ A61F 2002/0068; A61F 2002/016; A61F 2210/0057; A61F 2240/004; A61F 2250/0028; A61L 27/18; A61L 27/50; A61L 31/146; A61L 2430/34; B33Y 80/00; C08L 75/04
USPC ........................................................ 606/151
See application file for complete search history.

(56) References Cited

U.S. PATENT DOCUMENTS

| | | | |
|---|---|---|---|
| 10,687,967 B2 | 6/2020 | Kusleika et al. | |
| 10,696,034 B2 | 6/2020 | Pattinson et al. | |
| 2013/0103079 A1 | 4/2013 | Au et al. | |
| 2014/0039249 A1 | 2/2014 | Atalla | |
| 2014/0276337 A1* | 9/2014 | Reo | A61F 5/0076 604/8 |
| 2014/0276995 A1* | 9/2014 | Lau | A61F 2/0063 606/151 |
| 2020/0100920 A1* | 4/2020 | Finke | A61F 2/7812 |
| 2020/0113665 A1 | 4/2020 | Priewe | |
| 2020/0155292 A1 | 5/2020 | Bluecher et al. | |
| 2020/0238604 A1 | 7/2020 | Hart et al. | |
| 2020/0346420 A1* | 11/2020 | Friedrich | B32B 5/04 |
| 2020/0390944 A1* | 12/2020 | Williams | A61F 2/30756 |

OTHER PUBLICATIONS

"Modulus-dependent macrophage adhesion and behavior" by E.F. Irwin, et al., J. Biomater. Sci. Polymer Edn, vol. 19, No. 10, pp. 1363-1382 (2008).
"Capsular contracture around saline-filled and textured subcutaneously-placed implants in irradiated and non-irradiated breast cancer patients: Five years of monitoring of a prospective trial" by K. Benediktsson, L. Perbeck; Journal of Plastic, Reconstructive & Aesthetic Surgery (2006) 59, 27-34.
"Bipolar Pacemaker Leads: New Materials, New Technology" by John A. Schmidt, PhD, Larry J. Stotts, PhD, Journal of Investigative Surgery, 11:75-81, 1998.
"A Two-Year Prospective and Retrospective Multi-Center Study of the TriboFit® Hip System" by W. Siebert, et al., Journal of Long-Term Effects of Medical Implants, 19(2): 149-155 (2009).
"The Chemistry and Properties of the Medical-Grade Silicones" by Silas Braley, J. Macromol. Sci.-Chem., A4 (3), pp. 529-544, May 1970.
"Analysis of the properties of silicone rubber maxillofacial prosthetic materials" by Tariq Aziz, et al., Journal of Dentistry 31 (2003) 67-74.
"Textile properties of synthetic prolapse mesh in response to uniaxial loading" by William R. Barone, PhD; Pamela A. Moalli, MD, PhD; Steven D. Abramowitch, PhD, American Journal of Obstetrics & Gynecology Sep. 2016.
"The effects of substrate stiffness on the in vitro activation of macrophages and in vivo host response to poly(ethylene glycol)-based hydrogels" by Anna K. Blakney, Mark D. Swartzlander, and Stephanie J. Bryant; J Biomed Mater Res A. Jun. 2012 ; 100(6): 1375-1386. doi:10.1002/jbm.a.34104.
"Comparative study of auxetic geometries by means of computer-aided design and engineering" by Juan Carlos A' varez Elipe and Andres Diaz Lantada; Smart Materials and Structures, Smart Mater. Struct. 21 (2012) 105004 (12pp); doi:10.1088/0964-1726/21/10/105004; Published Jul. 27, 2012, Online at stacks.iop.org/SMS/21/105004.
"Long-Term In Vitro Stability Assessment of Polycarbonate Urethane Micro Catheters: Resistance to Oxidation and Stress Cracking" by Thomas Chandy, et al., Published online Oct. 6, 2008 in Wiley InterScience (www.interscience.wiley.com). DOI: 10.1002/jbm.b.31218.

"Normal Intraabdominal Pressure in Healthy Adults" by William S. Cobb, M.D., et al., Journal of Surgical Research: vol. 129, No. 2, Dec. 2005, doi:10.1016/j.jss.2005.06.015.
"The Argument for Lightweight Polypropylene Mesh in Hernia Repair" by William S. Cobb, MD, et al., Surgical Innovation, vol. 12, No. 1(Mar. 2005): pp. 63-69.
"Vaginal Mesh Contraction: Definition, Clinical Presentation, and Management" by Benjamin Feiner, MD, and Christopher Maher, MD; vol. 115, No. 2, Part 1, Feb. 2010 Obstetrics & Gynecology.
"Deterioration in biomechanical properties of the vagina following implantation of a high-stiffness prolapse mesh" by A Feola, et al.; Basic Science, DOI: 10.1111/1471-0528.12077, www.bjog.org; 2013 The Authors BJOG An International Journal of Obstetrics and Gynaecology.
"Effects of Rigidity of an Internal Fixation Device: A Comprehensive Biomechanical Investigation" by Vijay K. Goel, PhD, et al., Spine, vol. 16, No. 3 Supplement, 1991.
"Biomechanical Properties of Prolapsed Vaginal Tissue in Pre- and Postmenopausal Women" by J. T. W. Goh, International Urogynecology Journal; Int Urogynecol J (2002) 13:76-79.
"The influence of differing pore sizes on the biocompatability of two polypropylene meshes in the repair of abdominal defects" by F.H. Greca, et al., Hernia (2001) 5: 59-64; DOI 10.1007/s100290100001; Published Online: Jun. 22, 2001; Springer-Verlag 2001.
"The influence of porosity on the integration histology of two polypropylene meshes for the treatment of abdominal wall defects in dogs" by F. H. Greca, et al., Hernia (2008) 12:45-49, DOI 10.1007/s10029-007-0276-6; Published online: Sep. 7, 2007; Springer-Verlag 2007.
"Differential Effects of Cough, Valsalva, and Continence Status on Vesical Neck Movement" by Denise Howard, MD, MPH, et al.; vol. 95, No. 4, Apr. 2000; Vesical Neck Mobility.
"In vivo assessment of anterior compartment compliance and its relation to prolapse" by Yvonne Hsu, et al.; The International Urogynecological Association 2010; Int Urogynecol J (2010) 21:1111-1115; DOI 10.1007/s00192-010-1154-9; Published online: May 4, 2010.
"Adaptive Bone-Remodeling Theory Applied to Prosthetic-Design Analysis" by R. Huiskes, et al.; J. Biomechanics vol. 20, No. 11/12, pp. 1135-1150, 1987.
"Tensile properties of commonly used prolapse meshes" by Keisha A. Jones, et al.; The International Urogynecological Association 2009, Int Urogynecol J (2009) 20:847-853; DOI 10.1007/s00192-008-0781-x; Published online: Mar. 28, 2009.
"Effect of abdominal and pelvic floor tasks on muscle activity, abdominal pressure and bladder neck" by Baerbel Junginger, et al.; The International Urogynecological Association 2009; Int Urogynecol J (2010) 21:69-77, DOI 10.1007/s00192-009-0981-z; Published online: Sep. 3, 2009.
"Foreign Body Reaction to Meshes Used for the Repair of Abdominal Wall Hernias" by U. Klinge, et al.; Eur J Surg 1999; 165: 665-673; 1999 Scandinavian University Press. ISSN 1102-4151.
"Impact of Polymer Pore Size on the Interface Scar Formation in a Rat Model" by U. Klinge, et al.; Journal of Surgical Research 103, 208-214 (2002); doi:10.1006/jsre.2002.6358, available online at http://www.idealibrary.com on; published online Mar. 6, 2002.
"New Zealand white rabbit: a novel model for prolapse mesh implantation via a lumbar colpopexy" by Katrina M. Knight, et al.; The International Urogynecological Association 2019; International Urogynecology Journal (2020) 31:91-99; https://doi.org/10.1007/s00192-019-04071-z; Published online: Aug. 15, 2019.
"A soft elastomer alternative to polypropylene for pelvic organ prolapse repair: a preliminary study" by Katrina M. Knight, et al.; The International Urogynecological Association 2021; International Urogynecology Journal; https://doi.org/10.1007/s00192-021-04792-0; Published online: Apr. 16, 2021.
"Preventing Mesh Pore Collapse by Designing Mesh Pores With Auxetic Geometries: A Comprehensive Evaluation Via Computational Modeling" by Katrina M. Knight, et al.; Journal of Biomechanical Engineering; May 2018, vol. 140.
"The LP-ESP lumbar disc prosthesis with 6 degrees of freedom: development and 7 years of clinical experience" by Jean-Yves

(56) References Cited

OTHER PUBLICATIONS

Lazennec, et al., Eur J Orthop Surg Traumatol (2013) 23:131-143; DOI 10.1007/s00590-012-1166-x; Published online: Jan. 11, 2013; Springerlink.com.

"Biomechanical properties of prolapsed vaginal tissue in pre- and postmenopausal women" by Lingling Lei, et al.; International Urogynecology Journal 2006, Int Urogynecol J (2007) 18:603-607; DOI 10.1007/s00192-006-0214-7; Published online: Oct. 6, 2006.

"Vaginal degeneration following implantation of synthetic mesh with increased stiffness" by R. Liang, et al.; Basic Science, www.bjog.org, DOI: 10.1111/1471-0528.12085; 2013 The Authors BJOG An International Journal of Obstetrics and Gynaecology.

"Fatigue of injection molded and 3D printed polycarbonate urethane in solution" by Andrew T. Miller, et al.; journal homepage: www.elsevier.com/locate/polymer; Polymer 108 (2017) 121-134.

"Compressive cyclic ratcheting and fatigue of synthetic, soft biomedical polymers in solution" by Andrew T. Miller, et al.; Journal of the mechanical behavior of biomedical materials 54 (2016) 268-282; Available onlineOct. 8, 2015.

"Deformation and fatigue of tough 3D printed elastomer scaffolds processed by fused deposition modeling and continuous liquid interface production" by Andrew T. Miller, et al.; Journal of the Mechanical Behavior of Biomedical Materials 75 (2017) 1-13; www.elsevier.com/locate/jmbbm; Available online Jul. 1, 2017.

"Subject specific finite elasticity simulations of the pelvic floor" by Kimberley F. Noakes, et al.; Journal of Biomechanics 41 (2008) 3060-3065; journal homepage: www.elsevier.com/locate/jbiomech.

"Host response to synthetic mesh in women with mesh complications" by Alexis L. Nolfi, BS; American Journal of Obstetrics & Gynecology Aug. 2016; ajog.org; 2016 Published by Elsevier Inc; http://dx.doi.org/10.1016/j.ajog.2016.04.008.

"Comparative Analysis of Histopathologic Effects of Synthetic Meshes Based on Material, Weight, and Pore Size in Mice" by Sean B. Orenstein, M.D., et al., Journal of Surgical Research 176, 423-429 (2012); doi: 10.1016/j.iss.2011.09.031.

"The influence of the mechanical environment on remodelling of the patellar tendon" by A. P. Rumian, et al.; The Journal of Bone and Joint Surgery; vol. 91-B, No. 4, Apr. 2009.

"Design of planar isotropic negative Poisson's ratio structures" by S. Shan, et al., Extreme Mechanics Letters (2015); http://dx.doi.org/10.1016/j.eml.2015.05.002.

"Viscoelastic properties of a synthetic meniscus implant" by Maoz Shemesh, et al.; Journal of the mechanical behavior of biomedical materials 29 (2014) 42-55; www.sciencedirect.com; http://dx.doi.org/10.1016/j.jmbbm.2013.08.021.

"Uniaxial biomechanical properties of seven different vaginally implanted meshes for pelvic organ prolapse" by Jonathan P. Shepherd, et al.; The International Urogynecological Association 2011; Int Urogynecol J (2012) 23:613-620; DOI 10.1007/s00192-011-1616-8.

"Characterization of the T-cell response to polypropylene mesh in women with complications" by Lauren Tennyson, MD, et al.; Feb. 2019 American Journal of Obstetrics & Gynecology; https://doi.org/10.1016/j.ajog.2018.11.121.

International Search Report for PCT/US2022/012025 dated Mar. 30, 2022.

Written Opinion of the International Searching Authority for PCT/US2022/012025 dated Mar. 30, 2022.

* cited by examiner

ELASTOMERIC AUXETIC MEMBRANE FOR UROGYNECOLOGICAL AND ABDOMINAL IMPLANTATIONS

CROSS REFERENCE TO RELATED APPLICATIONS

This application is related to and claims the benefit of and priority to U.S. Provisional Application 63/205,849 filed on Jan. 11, 2021, the entire disclosure of which is hereby incorporated by reference in its entirety.

FIELD OF THE INVENTION

Embodiments relate to an elastomeric auxetic membrane, and particularly to an elastomeric auxetic membrane for urogynecologic and abdominal implantations.

BACKGROUND OF THE INVENTION

Urogynecologic surgical mesh is used to provide additional support when repairing damaged or weakened tissue. However, the pores of most current urogynecologic meshes contract and/or collapse in response to tensile loads. Pore collapse is problematic for surgical meshes, as meshes with small pores are associated with increased inflammation and fibrosis and have decreased tissue integration into the pores relative to meshes with large pores. Additionally, smaller pores increase the risk of bridging fibrosis (overlapping of the foreign body response to neighboring fibers resulting in a fibrous capsule), a process that can lead to encapsulation and pain. Clinically, pore collapse manifests as mesh contraction or "shrinkage" and is associated with vaginal pain that often does not resolve even with mesh removal resulting in poor patient outcomes. Pore collapse also changes the properties of the material, making it stiffer and resulting in stress shielding, the mechanism underlying mesh exposure. Most commercially available urogynecologic meshes are made from polypropylene, for which the minimal pore diameter for tissue integration has been shown to be 1 mm. Problematic areas for patients experiencing mesh complications are often located in areas where the pores of a mesh have collapsed well below this threshold of 1 mm with tensioning and loading.

Further, additional limitations of current meshes are material stiffness and permanent deformation with loading (i.e., permanent elongation of mesh). Propylene has a material stiffness that is orders magnitude stiffer than vaginal tissue, causing issues such as degeneration, decreased cellular response, and damage to underlying tissue.

Accordingly, there is a need for the development of a device with a stable pore geometry that does not collapse with tensioning and loading. Further, there is a need for a device that can complement the stiffness of native tissue, and a device that can withstand forces, both sudden and repetitive.

The present disclosure is directed toward overcoming one or more of the above mentioned problems, though not necessarily limited to embodiments that do.

SUMMARY OF THE INVENTION

Embodiments relate to the use of auxetic geometries to construct the pores of membranes. Auxetic geometries expand in the transverse direction when stretched along the longitudinal direction. This behavior is counterintuitive, as most materials contract in the transverse direction when stretched longitudinally. A membrane with pores that are auxetic has the potential to overcome the primary limitation of most prolapse meshes—pore collapse with tensile loading.

The disclosed device is referred to as a membrane as opposed to a mesh, as the term "mesh" implies a device manufactured via knitting or weaving. In contrast, the disclosed device is manufactured via molding or 3D printing.

In an exemplary embodiment, an elastomeric membrane for implantation in a human body, comprises a plurality of fibers, comprised of at least one polymer, and a plurality of pores, wherein each pore is defined by the plurality of fibers and has an auxetic shape such that a size of the pores expands in a direction transverse to a longitudinal axis when the membrane is subject to a tensile load along the longitudinal axis.

In some embodiments, the at least one polymer is polycarbonate urethane.

In some embodiments, the plurality of fibers have a material stiffness that is similar to a native tissue to which the membrane is attached.

In some embodiments, the plurality of fibers have a material stiffness of 6 to 35 MPa.

In some embodiments, the at least one polymer is a combination of at least two different types of fibers.

In some embodiments, the at least one polymer is a combination of at least two different grades of a single type of polymer.

In some embodiments, the plurality of fibers have an original length and are configured to return to a second length after tensile loading or unloading at 15 N, wherein the second length is less than or equal to 40% longer than the original length.

In some embodiments, the auxetic shape is a bowtie shape.

In some embodiments, the bowtie shape has horizontal edges and is oriented such that the horizontal edges are perpendicular to an axis of loading.

In some embodiments, the auxetic shape is a chiral hexagon shape.

In some embodiments, each pore has a minimum pore diameter of 0.5 to 5.0 mm.

In some embodiments, the membrane is manufactured using a technique that yields a membrane with no knots or interstices.

In some embodiments, the plurality of fibers have a width between 0.3 and 1 mm in an untensioned state.

In some embodiments, the plurality of fibers have a thickness between 0.3 and 1 mm in an untensioned state.

In some embodiments, the membrane has an effective pore area that does not change in response to a tensile load up to 15 N.

In some embodiments, the at least one polymer is non-biodegradable.

In some embodiments, the at least one polymer is bioresorbable.

In some embodiments, the at least one polymer is configured to interact with a native tissue to enhance tissue integration.

In some embodiments, the membrane comprises a body section and at least one arm section, wherein the at least one arm section extends outwardly from the body section.

In some embodiments, the membrane has a porosity greater than or equal to 75%.

In an exemplary embodiment, a method of implanting a membrane in a human body comprises providing an elastomeric membrane for implantation in the human body. The elastomeric membrane comprises a plurality of fibers, comprised of at least one polymer, and a plurality of pores, wherein each pore is defined by the plurality of fibers and has an auxetic shape such that a size of the pores expands in a direction transverse to a longitudinal axis when the membrane is subject to a tensile load along the longitudinal axis. The method further comprises orienting the plurality of pores to maximize pore expansion when the membrane is subject to the tensile load along the longitudinal axis, and attaching the membrane to human tissue.

In some embodiments, the auxetic shape is a bowtie comprising horizontal edges, and the method further comprises orienting the plurality of pores such that the horizontal edges of the pores are perpendicular to the tensile load along the longitudinal axis.

In some embodiments, the auxetic shape is a bowtie comprising horizontal edges, and the method further comprises orienting the plurality of pores such that the horizontal edges of the pores are aligned with the tensile load along the longitudinal axis.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

DETAILED DESCRIPTION OF THE INVENTION

Figure 1:
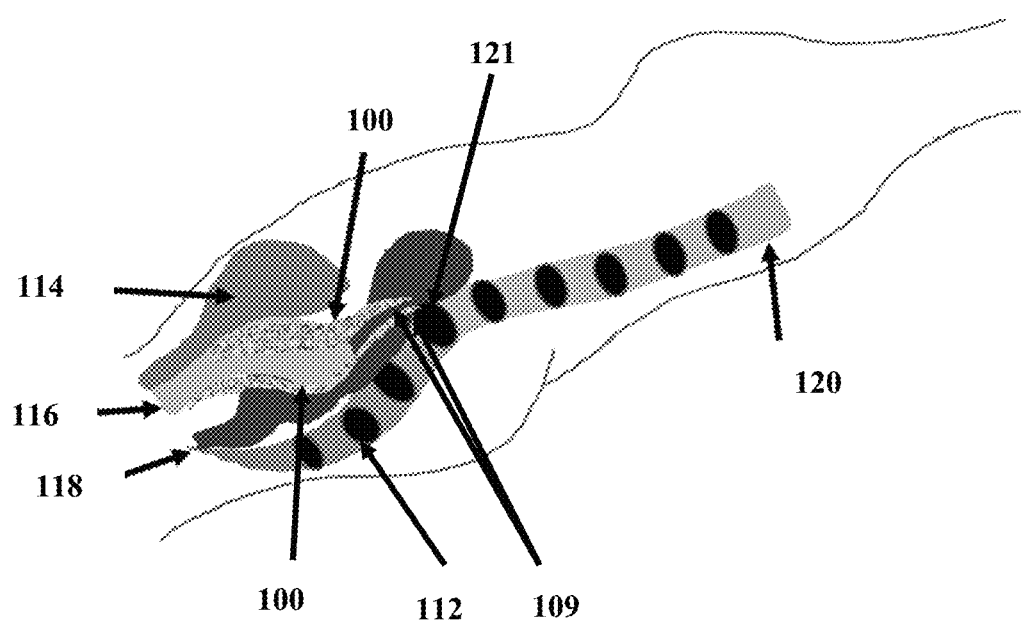
FIG. 1 shows a schematic view of an elastomeric auxetic membrane insertion by sacrocolpopexy.

The following description is of exemplary embodiments that are presently contemplated for carrying out the present invention. This description is not to be taken in a limiting sense, but is made merely for the purpose of describing the general principles and features of various aspects of the present invention. The scope of the present invention is not limited by this description.

Embodiments relate to an elastomeric auxetic membrane (EAM). The EAM 100 may be used in urogynecologic procedures including, but not limited to, transabdominal prolapse procedures (sacrocolpopexy) (see FIGS. 1 and 2A-2B), transvaginal prolapse repairs (see FIGS. 3-4), and mid-urethral slings. It is contemplated that the EAM 100 may also be used in other surgical procedures including, but not limited to, abdominal hernia repairs (see FIG. 5), inguinal hernia repairs (see FIG. 5), diaphragmatic hernia repairs (see FIG. 5), and other like surgical procedures.

The EAM 100 is a three-dimensional porous device that includes a plurality of open spaces (i.e., pores 102) that may be defined by polymeric fibers 104 with no knots (i.e., having no small spaces and interstices that are less than <100 um). As used herein, pores 102 generally describes 102', 102", and/or 102'''. It is contemplated that the EAM 100 is manufactured using 3D printing, molding, or other techniques that adequately yield a membrane with no knots or interstices. The EAM 100 may be in the form of any shape, and it is contemplated that the shape of the EAM 100 may complement a particular procedure or native tissue for which the EAM 100 is being used. In an exemplary embodiment, the EAM 100 may consist of a body section 106 only, or may consist of a body section 106 and either one or more arm sections 108 or a stem section 109, wherein the arm sections 108 and stem sections 109 extend outwardly from the body section 106. In an exemplary embodiment, the arm sections 108 may be used to tension the EAM 100 to ligaments 122 and other tissue. In another exemplary embodiment, the stem section 109 may be used to bridge two independent body sections 106, one anterior and one posterior, to the sacrum 112. For example, one or more arm sections 108 may be attached to a common body section 106 in a Y configuration (see FIGS. 3-4), or a stem section 109 may connect two body sections 106 in a Y configuration (see FIG. 2B). It is further contemplated that the arm sections 108 or stem section 109 may have a larger surface area than the body section 106. Additionally, the EAM 100 may have any dimensions, and it is contemplated that the dimensions of the EAM 100 may complement a particular procedure or native tissue for which the EAM 100 is being used.

In an exemplary embodiment, for a transabdominal prolapse procedure, the EAM 100 may be a rectangular shape and have overall dimensions of about 5 cm (width) and 15 cm (length). In another exemplary embodiment, for a transvaginal prolapse repair, the EAM 100 may have arm section 108 dimensions of about 1 to 3 cm (width) and about 5 to 15 cm (length), and a body section 106 dimension of about 5 to 7 cm (width) and 5 to 15 cm (length).

Figure 8A:
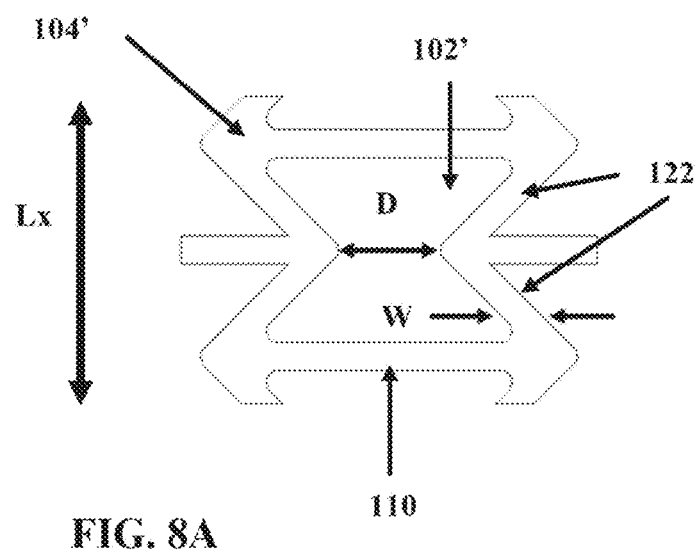
FIG. 8A is a front view of a pore having an exemplary bowtie auxetic geometry demonstrating minimum pore diameter and fiber width.
Figure 8B:
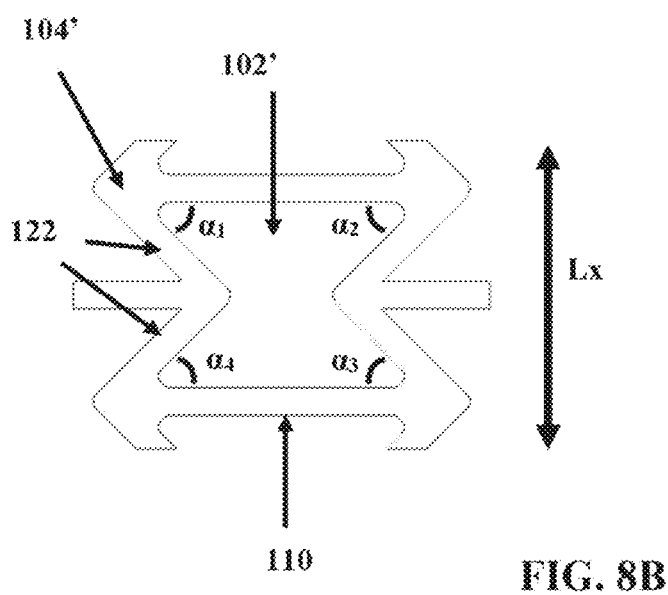
FIG. 8B is a front view of a pore having an exemplary bowtie auxetic geometry demonstrating internal angles.
Figure 8C:
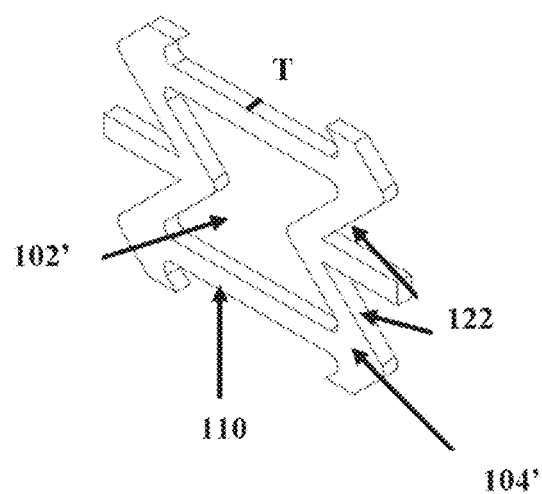
FIG. 8C is an isometric view of a pore having an exemplary bowtie auxetic geometry demonstrating fiber thickness.

The width W and thickness T of the fibers 104 in an untensioned state may generally range between 0.3 mm and 1 mm (see FIGS. 8A and 8C). An untensioned state may be defined as a state in which the EAM 100 has no forces or loading acting upon it. However, as one skilled in the art will appreciate, it is contemplated that the fiber width W and/or fiber thickness T may vary depending on a number of factors including, but not limited to, the severity of the condition (e.g. the degree of prolapse) and/or the body mass index of the individual in whom the EAM 100 will be placed.

The fibers 104 may be made from one or more polymers. The polymer(s) may include, but is not limited to, polycarbonate urethane (PCU). It is contemplated that the polymer(s) has a material stiffness that is similar to the native tissue for which the EAM is being used. In an exemplary embodiment, wherein the native tissue is vaginal tissue comprising an estimated tangent modulus or stiffness of 6 to 35 MPa, the material stiffness of the EAM may be similar to (i.e., 6 to 35 MPa), or one that is one or two orders in magnitude stiffer (i.e., 60 to 350 MPa, or 600 to 3,500 MPa), than vaginal tissue. The fibers 104 may comprise one polymer or of a combination of two or more different polymers, or of a combination of two or more different grades of a single type of polymer. For example, PCU is available in a range of durometers that are typically reported as Shore hardness ranging from 75 A, 85 A, 95 A, and 75D (also referred to as grades), and the fibers 104 may be comprised of one PCU grade or a combination of PCU grades depending on the application of the EAM 100. Any polymer or combination of polymers that provide adequate strength, toughness, and durability while maintaining biocompatibility for soft tissue repairs is suitable.

It is contemplated that the polymer(s) may be non-biodegradable (i.e., permanent). Non-biodegradable may be defined as the ability of the polymer(s) to resist physical and/or chemical changes and to maintain its position within native tissue. It is further contemplated that the polymer(s) may be bioresorbable. Bioresorption may be defined as the ability of the polymer(s) to naturally degrade and/or dissolve over time. It is further contemplated that the polymer(s) may have a combination of both non-biodegradable and bioresorbable properties.

It is contemplated that the polymer(s) may have shape-memory properties (i.e., the polymer(s) may be elastomeric or exhibit elastomeric properties). Shape-memory may be further defined as the ability of the polymer(s) to minimize and potentially eliminate the amount that the EAM 100 permanently elongates in response to repetitive loading, and the EAM's 100 ability to return to its original configuration. Specifically, the polymer(s) may deform and return to an initial length with minimal permanent elongation. It is contemplated that a minimal permanent elongation after cyclic loading or unloading of 15 N is less than or equal to a 40% increase in the EAM's 100 initial length. The shape-memory characteristic mimics native soft tissues.

It is contemplated that the polymer(s) may be modified for the conjugation of proteins and other biomolecules of interest that promote interaction with native tissue to enhance tissue integration. Click chemistry is a popular technique for engineering bioactive polymers due to mild reaction conditions. Thus, motifs such as oximes or dialdehydes that facilitate crosslinking or attachment of peptides may be added. In an exemplary embodiment, the polymer(s) may be modified to provide for an RGD moiety for binding to integrins. In another exemplary embodiment, the one or more polymers may be modified to provide for a VAPG moiety for binding to elastin.

Figure 6A:
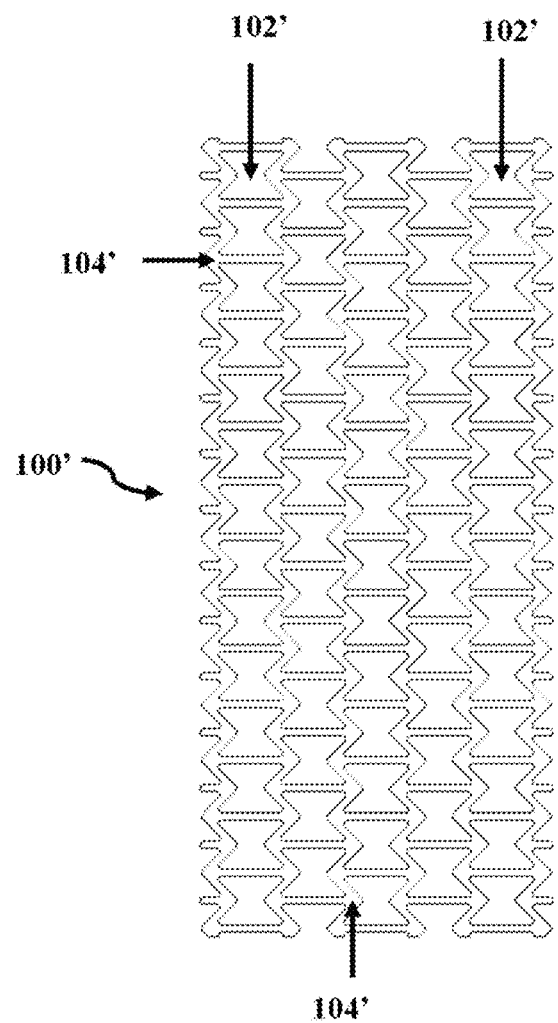
FIG. 6A is a front view of an elastomeric auxetic membrane with pores having an exemplary bowtie auxetic geometry.
Figure 6B:
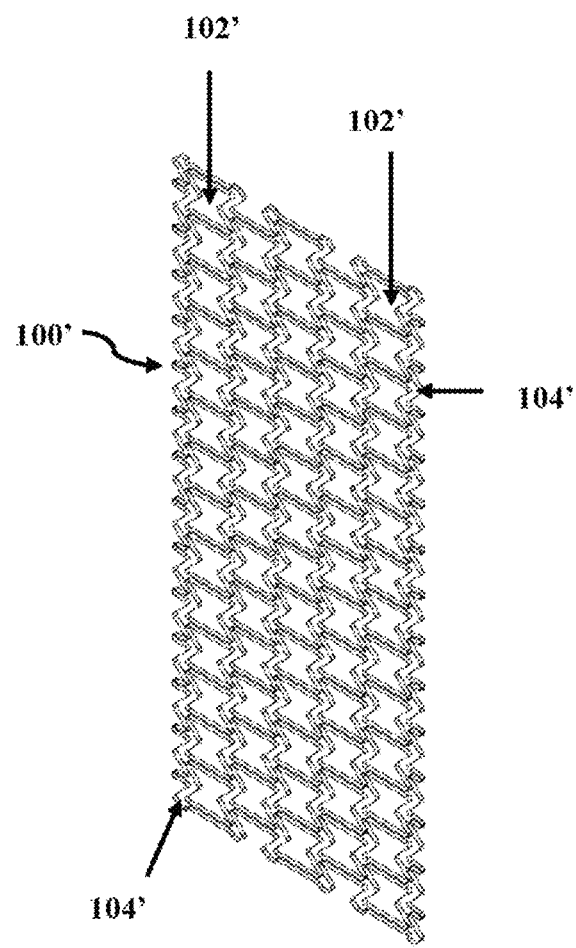
FIG. 6B is an isometric view of an elastomeric auxetic membrane with pores having an exemplary bowtie auxetic geometry.
Figure 6C:
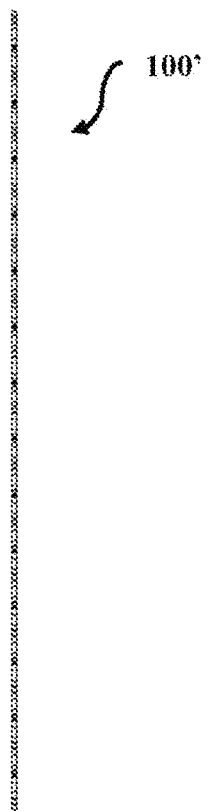
FIG. 6C is a side view of an elastomeric auxetic membrane with pores having an exemplary bowtie auxetic geometry.
Figure 7A:
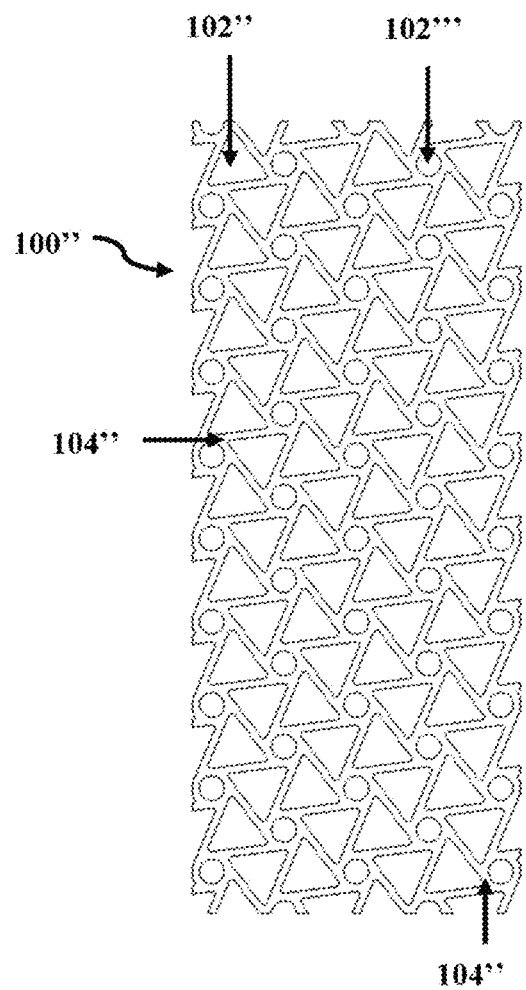
FIG. 7A is a front view of an elastomeric auxetic membrane with pores having an exemplary chiral hexagon auxetic geometry.
Figure 7B:
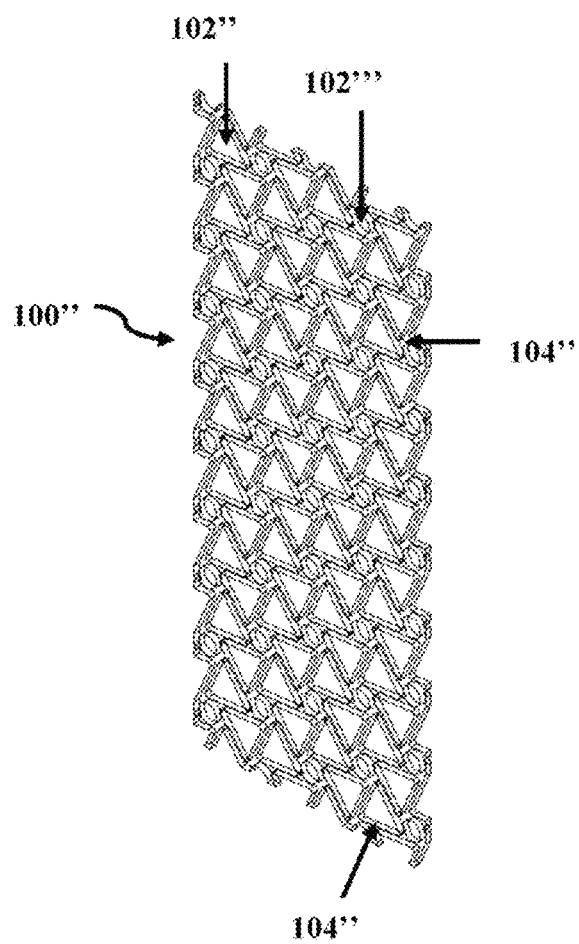
FIG. 7B is an isometric view of an elastomeric auxetic membrane with pores having an exemplary chiral hexagon auxetic geometry.
Figure 7C:
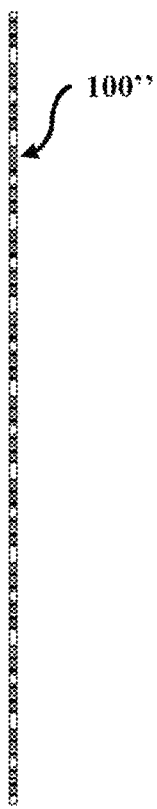
FIG. 7C is a side view of an elastomeric auxetic membrane with pores having an exemplary chiral hexagon auxetic geometry.
Figure 10:
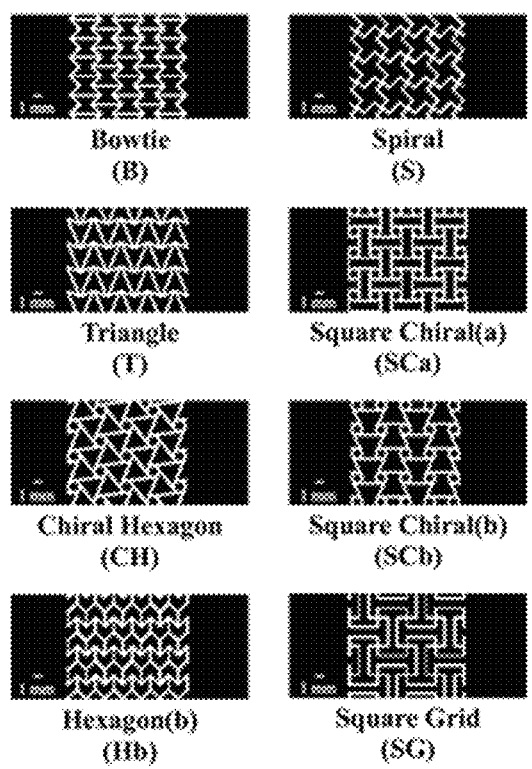
FIG. 10 shows a front view of computational models of exemplary elastomeric auxetic membranes having pores with various types of auxetic geometries.

The pores 102 of the EAM 100 are in the form of an auxetic shape. An EAM 100 with auxetic pores 102 allows for adequate porosity and pore expansion for tissue integration. An auxetic shape expands in the transverse direction when stretched along the longitudinal direction, and is associated with a negative relative lateral contraction, which is analogous to a negative Poisson's ratio which describes deformation in the transverse axis relative to the longitudinal axis. This behavior (i.e., expansion of the pores 102 when loaded or elongated) is counterintuitive as most materials and shapes contract in the transverse direction when stretched longitudinally. Auxetic shapes that can be used include, but are not limited to bowtie (see FIGS. 6A-6C), chiral hexagon (see FIGS. 7A-7C), hexagon, spiral, triangle, square chiral, and square grid (see FIG. 10). The pores 102 may have an auxetic shape that is either anisotropic of isotropic. Isotropic auxetic geometry may consist of any combination of polygons including, but not limited to, squares, circles, rectangles, hexagons, etc. Given that the pores 102 will expand independent of the orientation of the pores 102 with respect to the direction of loading Lx, the isotropic auxetic pore orientation is often negligible. The direction of loading Lx may be defined as the axis or axes in which force is applied to an object. It is contemplated that the auxetic geometry may be oriented to maximize pore expansion.

Figure 9A:
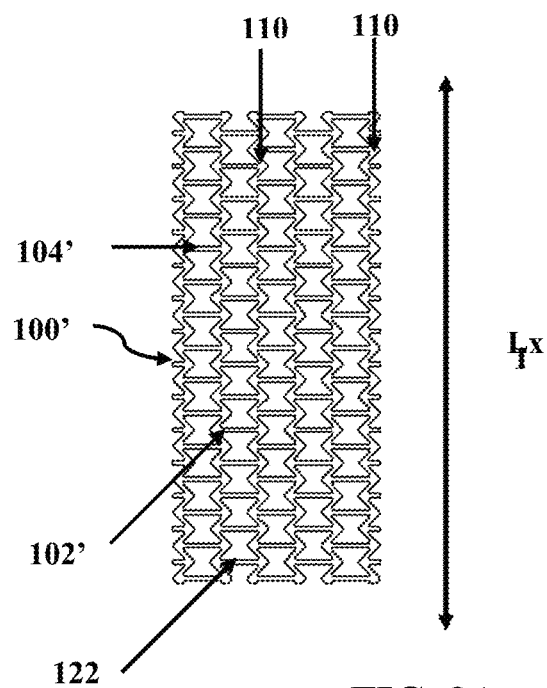
FIG. 9A is a front view of an elastomeric auxetic membrane with pores having an exemplary bowtie auxetic geometry demonstrating an orientation in which the horizontal edges of the bowtie auxetic geometry are perpendicular to the direction of loading.
Figure 9B:
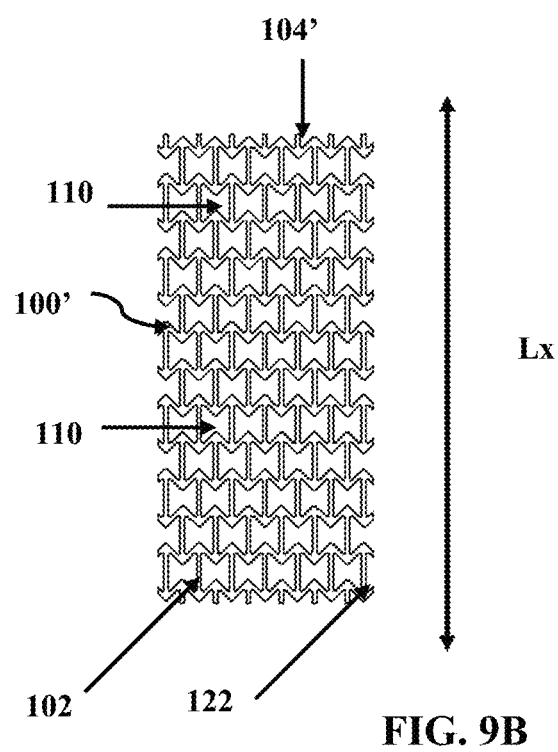
FIG. 9B is a front view of an elastomeric auxetic membrane with pores having an exemplary bowtie auxetic geometry demonstrating an orientation in which the horizontal edges of the bowtie auxetic geometry are aligned with the direction of loading.

In an exemplary embodiment, the auxetic shape of the EAM 100' is defined by fibers 104' as a bowtie pore 102' (see FIGS. 6A-6C), in which the bowtie pores 102' consist of six sides (see FIG. 8A) and four congruent internal angles ($\alpha_1$, $\alpha_2$, $\alpha_3$, and $\alpha_4$) (see FIG. 8B). The internal angles may be between 15° and 70°. The bowtie pores 102' consist of two horizontal edges 110 opposite of one another, and two bent members 122 opposite of one another. The bent members 122 are directed inward toward the center of the bowtie. In use, the bowtie pore 102' geometry will be oriented to maximize pore expansion, such that the horizontal edges 110 of the bowtie pore 102' are perpendicular (see FIG. 9A) or aligned (see FIG. 9B) along the direction of loading Lx. As stated above, the direction of loading Lx may be defined as the axis or axes in which force is applied to an object. In another exemplary embodiment, the auxetic shape of the EAM 100" is defined by fibers 104" as chiral hexagon pores (see FIGS. 7A-7C), in which the pores consist of a combination of triangles 102" and circles 102''' oriented in a manner to maximize pore expansion.

As a result of the auxetic shape of the pores 102', it is contemplated that the pores 102' may have a minimal diameter D between 0.5 mm and 5.0 mm, with a preferable minimal diameter of 1 mm, regardless of whether the pores 102' are in a tensioned or untensioned state. One skilled in the art will appreciate that the minimal diameter D will increase as the pores 102' expand. However, as one skilled in the art will appreciate, it is contemplated that the minimal diameter D may vary depending on a number of factors including, but not limited to, the severity of the condition (e.g. the degree of prolapse) and/or the body mass index of the individual in whom the EAM 100 will be placed. An untensioned state may be defined as a state in which the EAM 100 has no forces or loading acting upon it. Pores 102' of an auxetic shape also result in an EAM 100 with an increased overall pore area, an increased porosity (i.e., greater than or equal to 75%), and an effective porosity greater than 80% in response to tension and elongation. The effective porosity is defined by the percentage of pores 102' greater than 1 mm in diameter.

In response to tensile loading or elongation, the pores 102' of the EAM 100 will remain open (i.e. pore size will be greater than or equal to the unloaded pore size) when implanted along the intended direction of loading Lx or irrespective of the orientation with respect to the direction of loading Lx for the isotropic auxetic pore geometry. The EAM 100 will also experience increased porosity (greater than or equal to 75%) and an effective porosity greater than 80% in response to tension and elongation. It is further contemplated that due to the inherent nature of the auxetic geometry, the polymer(s) used, and the method of manufacture using 3D printing or molded technology (i.e., absence of knots) the EAM 100 will experience minimal wrinkling in response to tension and elongation.

Moreover, the EAM has an effective pore area that does not change in response to tensile loading or elongation within the physiologic range (i.e., loads up to 15 N). Specifically, in an exemplary embodiment, the effective pore area of an EAM manufactured using polydimethylsiloxane, a relatively weak polymer, did not change in response to tensile loads up to 3 N, and it is contemplated that the effective pore area of an EAM manufactured using a stronger polymer (i.e., PCU), will remain unchanged in response to tensile loads up to 15 N.

In reference to FIG. 1, in an exemplary method of use, the EAM 100 is inserted by sacrocolpopexy, a procedure performed via minimally invasive laparoscopy, laparoscopy assisted robotic surgery, or laparotomy. In all 3 approaches, a dissection is carried down to the sacrum 112 extending to the site of the EAM 100 attachment and tensioning. The bladder 114 is dissected off of the anterior vagina 116 and the rectum 118 dissected off of the posterior vagina 116. A strap of the EAM 100 (typically 5 by 15 cm) is placed between the bladder 114 and the vagina 116, and a second strap of the same size between the rectum 118 and the vagina 116. The two straps are then pulled up to the longitudinal ligament of the spine 120 at the level of the sacrum 112 and attached to it; thereby lifting the vagina 116 back into its physiological position. For the membrane bridge to the sacrum 112, the two straps of EAM 100 can be attached individually or through a common stem section 109 in a Y configuration at attachment site 121. For an auxetic EAM 100, the orientation would be such that when the EAM 100 is tensioned longitudinally, the pores 102 open in that direction. Typically, 8 to 10 cm of an arm section 108 is used posteriorly and 4 to 6 cm anteriorly. The stem section 109 can range from 3 to 8 cm. For this invention, the amount of material in the body section 106 of the EAM 100 in contact with the vagina 116 may differ from that of the bridge to the sacrum 112.

Figure 2A:
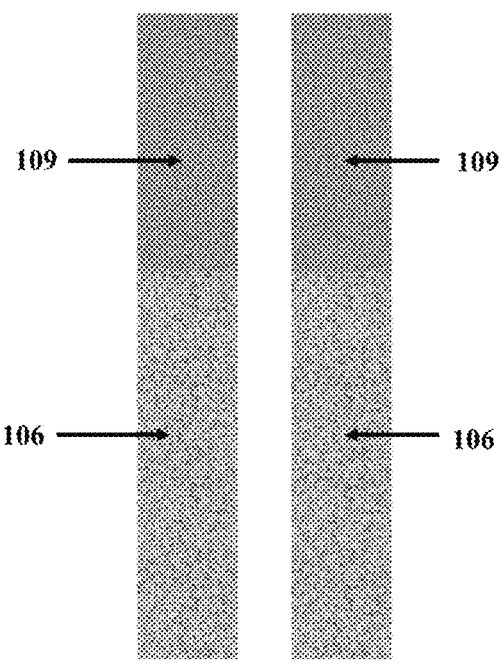
FIG. 2A shows a front view of stems and straps of elastomeric auxetic membrane for use in sacrocolpopexy.
Figure 2B:
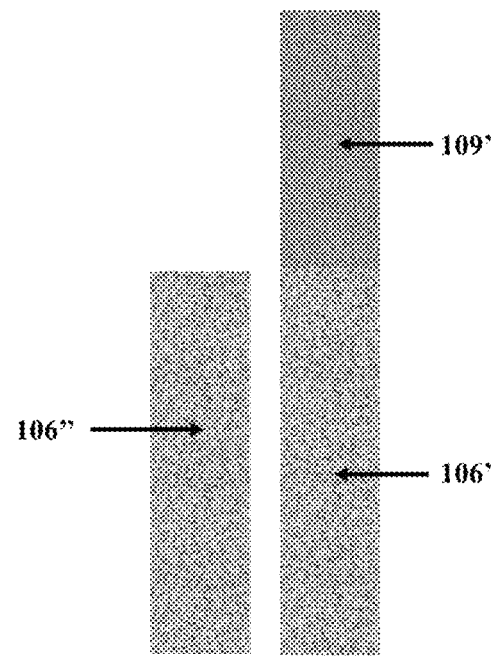
FIG. 2B shows a front view of a stem and straps of elastomeric auxetic membrane in a Y configuration for use in sacrocolpopexy.

Specifically, in reference to FIG. 2A, sacrocolpopexy EAMs can be configured from two straps of membrane, each containing (i) a body section 106 that is sutured over the vagina, and (ii) a stem section 109 from each strap that forms a bridge between the vagina and the sacrum. Alternatively, in reference to FIG. 2B, the EAM can also be configured into a Y in which a posterior body section 106" is attached to an anterior body section 106', which has a stem section 109', at the interface with the stem section 109'. In this case, the single stem section 109' forms the bridge between the vagina and the sacrum. The stem section 109 may have different textile and mechanical properties than the body section.

Figure 3:
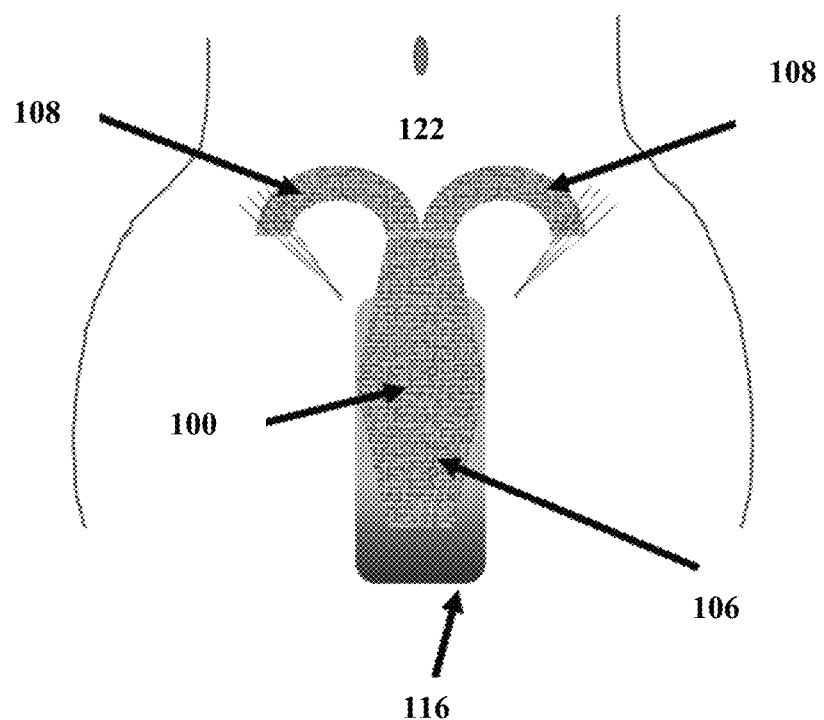
FIG. 3 shows a schematic view of an anterior elastomeric auxetic membrane vaginal insertion.
Figure 4:
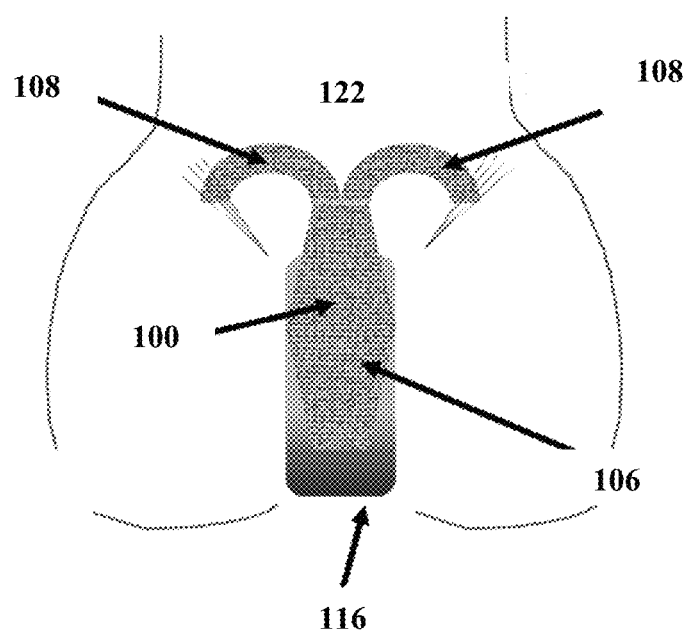
FIG. 4 shows a schematic view of a posterior elastomeric auxetic membrane vaginal insertion.
Figure 5:
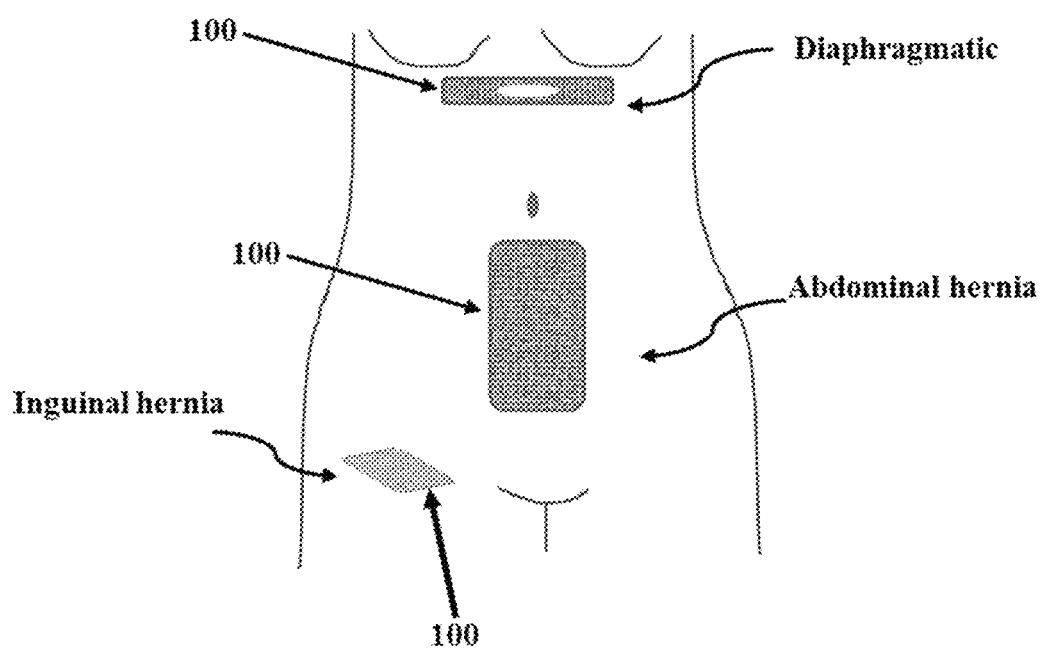
FIG. 5 shows a schematic view of potential sites of an elastomeric auxetic membrane for hernia repair surgery.

In reference to FIGS. 3 and 4, in another exemplary method of use, the EAM 100 is used during transvaginal prolapse repairs. During this procedure, the EAM 100 is used to reinforce the anterior wall, the vaginal apex or uterus, and the posterior vaginal wall. A full thickness incision is made in the vagina 116 and the associated organ (i.e., bladder, small bowel, or rectum) dissected away. The dissection is carried down to the sacrospinous ligament or the uterosacral ligament. The membrane is placed over the vaginal wall and then tensioned to the ligaments 122 via arm sections 108 or a suture attachment. The amount of material may vary along the EAM's 100 length. It is contemplated that the arm sections 108 of the EAM 100 that insert into the ligaments 122 may have more material than that the body section 106 in contact with the vagina 116. The pore geometry may be chosen such that the pores 102 will remain open along the direction of loading. The vaginal incision 116 will be closed over the EAM 100.

In another exemplary method of use, the EAM 100 is used as a mid-urethral sling. An incision will be made into the vagina 116 over the mid-urethra and extended laterally toward the ischiopubic ramus. An EAM 100 with dimensions of 1.5 by 6.25 cm will be placed over the mid-urethra and pulled through the retropubic space, or the transobturator space, or through the fascia overlying the obturator externus. After a cystoscopy to verify that the membrane had not entered the urethra or bladder, the EAM 100 will be tensioned over the urethra. The vagina 116 will then be closed over the EAM 100.

In another exemplary method of use, the EAM is used for inguinal hernia repair. After incising the skin, subcutaneous tissue, and external oblique aponeurosis, the spermatic cord (males) is elevated from the posterior wall of the inguinal canal. In indirect hernias, the hernial sac is identified, dissected to the internal ring and opened to allow examination of its contents. The sac is ligated and its distal portion is usually excised. In this context, an appropriately sized EAM is prefabricated or trimmed to fit the floor of the inguinal canal. The apex is first sutured to the public tubercle using 3-0 Prolene suture. The same continuous suture is then used to suture the lower border of the membrane to the free edge of the inguinal ligament after an opening is made into its lower edge to accommodate the spermatic cord. The continuous suture extends up just medial to the anterior superior iliac spine. Interrupted Prolene sutures then suture the two cut edges of the membrane together around the spermatic cord. The inferomedial corner of the membrane is then attached while overlapping the pubic tubercle. The membrane is then anchored to the conjoined tendon by metal staples (i.e., titanium) or by interrupted sutures (i.e., Prolene 3-0). The aponeurosis of external oblique is closed using absorbable sutures (i.e., Vicryl No 2). The skin is then closed.

In another exemplary method of use, the EAM is used for abdominal wall or ventral hernia repair. Surgical repair technique can be performed minimally invasively or open. In some instances, an EAM can be placed over a suture repair of the fascial defect while in others in which a suture repair is not possible, the EAM is used to cover the defect and fixed in place by sutures or alternatively via a tack device. Typically, the EAM is placed over a fascial defect such that 5 cm of the membrane spans all sides of the defect.

In another exemplary method of use, the EAM is used for hiatal or diaphragmatic hernia repairs. Hiatal hernias can effectively be repaired via a transabdominal or transthoracic approach. More recently, a laparoscopic approach has gained popularity as it is markedly less morbid than an open approach. The use of surgical mesh for reinforcement of large hiatal hernia repairs has been shown to lead to decreased recurrence rates. Surgical repair may be a primary suture closure reinforced by the EAM or an EAM closure alone (larger defects). In both cases, the defect of the diaphragm is closed by placing the EAM over the space between the diaphragm and the esophagus after reduction of the herniated contents.

EXAMPLES

The following examples serve to illustrate certain aspects of the disclosure and are not intended to limit the disclosure.

Example 1

Figure 11:
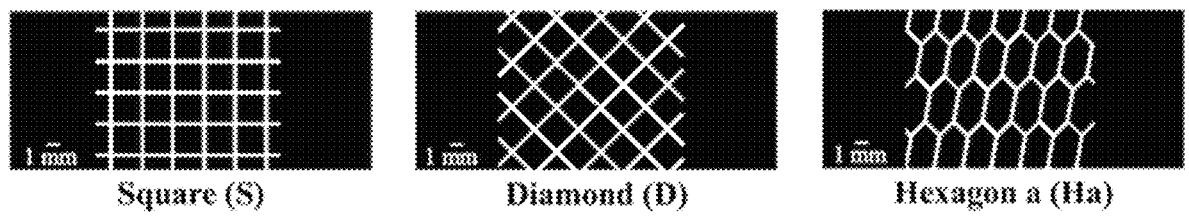
FIG. 11 shows a front view of computational models of exemplary elastomeric auxetic membranes having pores with standard geometries.

Computational models of membranes with different auxetic geometries intended for use via a sacrocolpopexy, in which the forces along the membrane in vivo are predominantly uniaxial, were constructed. The deformation of the models was assessed via simulated uniaxial tensile tests using finite element analysis (FEA). A simulated load of 3 N was applied along the longitudinal axis of the models. The pore geometries for the auxetic models included (1) bowtie, (2) chiral hexagon, (3) hexagon(b), (4) spiral, (5) triangle, (6) square chiral(a), (7) square chiral(b), and (8) square grid (see FIG. 10). For comparison purposes, computational models with standard pore geometries mimicking current commercially available prolapse meshes were also created. The standard models included (1) square, (2) diamond, and (3) hexagon(a) (see FIG. 11). Quantitative measurements of the following parameters were used to characterize the deformation of the pore geometries and models overall: minimal pore diameter, effective pore area (defined by the area of the pores with widths greater than 1 mm), porosity (defined by the amount of pore space within the mesh), effective porosity (defined by the amount of void space within the membrane from the pores that are greater than 1 mm), and relative lateral contraction (representative of the degree of contraction of the model with a positive value indicating model contraction (i.e., pore collapse) and a negative value indicating expansion (i.e., pores remaining open/enlarging)).

TABLE 1

| Geometry | Minimal Pore Diameter (% Change) | Effective Pore Area (% Change) | Porosity (% Change) | Effective Porosity (% Change) | Relative Lateral Contraction at 3N |
|---|---|---|---|---|---|
| Bowtie | +113.0% | No change | +25.9% | +25.9% | −0.47 |
| Chiral Hexagon | −18.9% | −10.7% | +6.9% | −5.2% | 0.19 |
| Hexagon (b) | +125.0% | No change | +21.4% | +21.4% | −0.02 |
| Spiral | −2.0% | No change | +12.9% | +12.9% | −0.13 |
| Triangle | −30.2% | No change | +14.5% | +14.5% | 0.34 |
| Square Chiral(a) | −32.0% | −13.0% | +15.0% | No change | −0.15 |
| Square Chiral(b) | −32.7% | −12.3% | +15.3% | No change | −0.09 |
| Square Grid | +443.0% | No change | +40.3% | +40.3% | −0.34 |
| Square | −3.9% | No change | +2.7% | +2.7% | 0.14 |
| Diamond | −81.6% | −100% | −33.3% | −100.0% | 1.65 |
| Hexagon (a) | −43.5% | No change | −12.5% | −12.5% | 2.32 |

Regarding effective pore area, the effective pore area for all models was 100%. No change means that the effective pore area at 3 N was maintained at 100%. Regarding effective porosity, no change means that the effective porosity before (0 N) and after loading (3 N) are the same. Regarding relative lateral contraction, a positive value indicates model contraction and a negative value indicates model expansion/pore expansion.

As seen in Table 1, the results show that, generally, auxetic pore geometries expand in response to uniaxial loading. As anticipated, the models with standard pore geometries contracted and/or their pores collapsed with loading consistent with ex vivo testing of commercial polypropylene meshes with similar pore geometries.

Example 2

Figure 12:
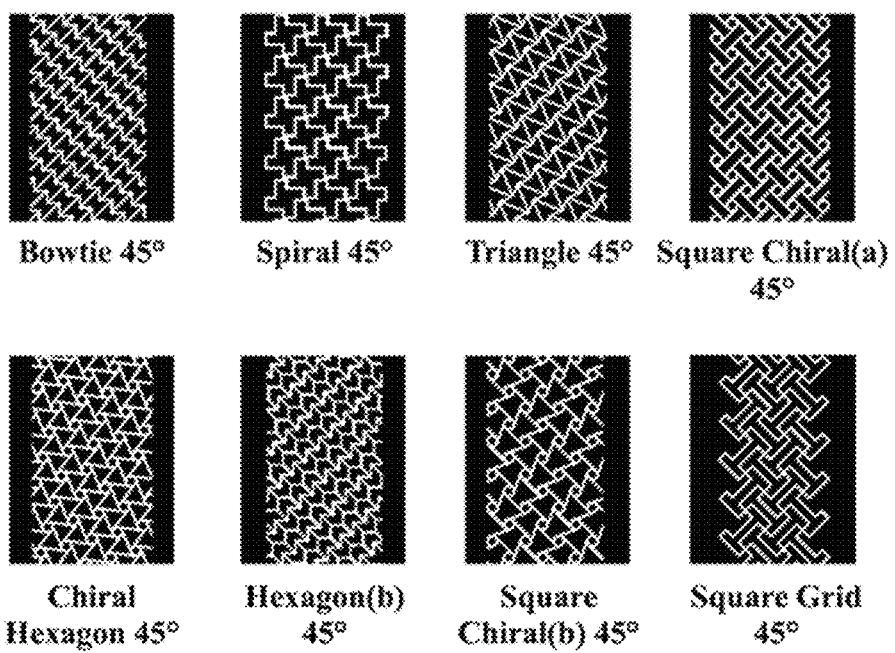
FIG. 12 shows a front view of computational models of exemplary elastomeric auxetic membranes having pores with various types of auxetic geometries and rotated 45°.
Figure 13:
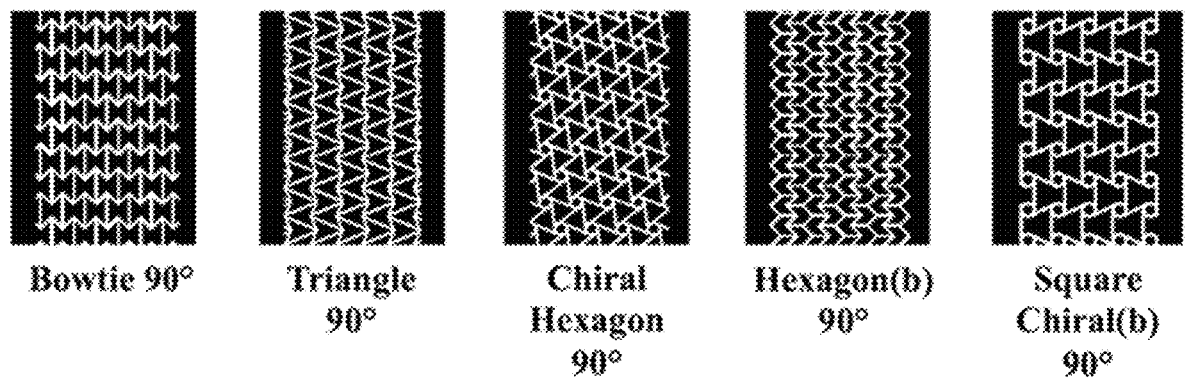
FIG. 13 shows a front view of computational models of exemplary elastomeric auxetic membranes having pores with various types of auxetic geometries and rotated 90°.

Computational models of membranes with different auxetic geometries intended for use via transvaginal prolapse repairs, in which the forces along the membrane are oriented in a variety of directions, were constructed. For transvaginal membranes, it was important to assess how pore orientation impacts the ability of auxetic pores to expand in multiple directions. Accordingly, the deformation of the models was assessed via simulated tensile tests FEA with the auxetic pores rotated 45° (see FIG. 12) and 90° (see FIG. 13) with respect to the longitudinal axis of the membranes. A simulated load of 3 N was applied along the longitudinal axis of the models. For 3 of the 8 auxetic geometries, a 90° rotation resulted in the same pore orientation as the respective model created in the previously mentioned FEA study; hence, there were only five models with the pores rotated 90°: (1) bowtie, (2) triangle, (3) chiral hexagon, (4) hexagon (b), and (5) square chiral (b). All of the auxetic geometries were tested with a 45° degree rotation.

In response to 3 N, the pores of all of the models with the pores rotated at 45° contracted and only two of the auxetic geometries were able to maintain its ability to expand when rotated 90°, the bowtie and triangle. Collectively, these results suggest that, in addition to load dependence, the ability of an auxetic geometry to expand is also dependent on the orientation of the auxetic geometry with respect to the direction of loading. The chiral hexagon geometry demonstrated the least sensitivity to pore orientation relative to the other auxetic geometries.

Example 3

Figure 14:
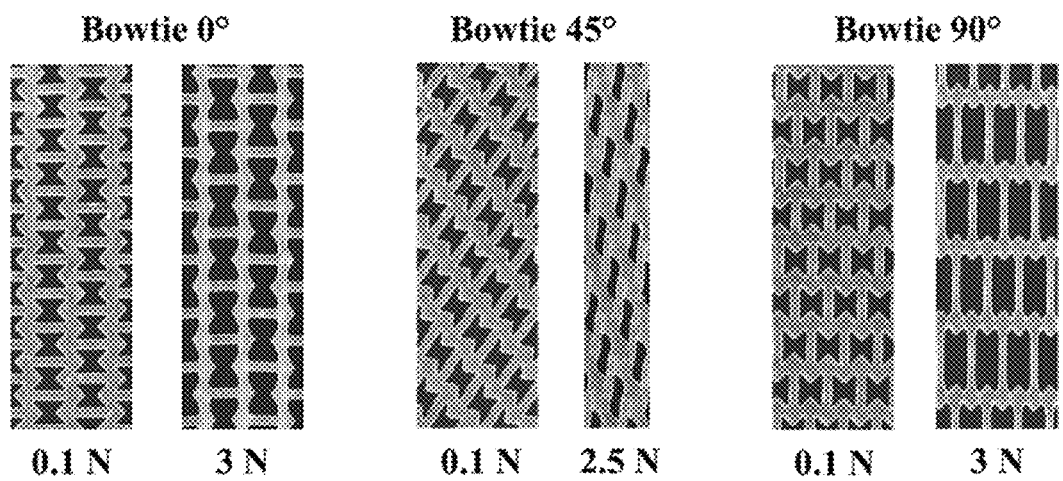
FIG. 14 shows images of the central regions of elastomeric auxetic membranes with pores having an exemplary bowtie auxetic geometry loaded longitudinally from 0.1 N to 2.5 N or 3 N and rotated at 0°, 45°, and 90° with respect to the longitudinal axis of the membranes.
Figure 15:
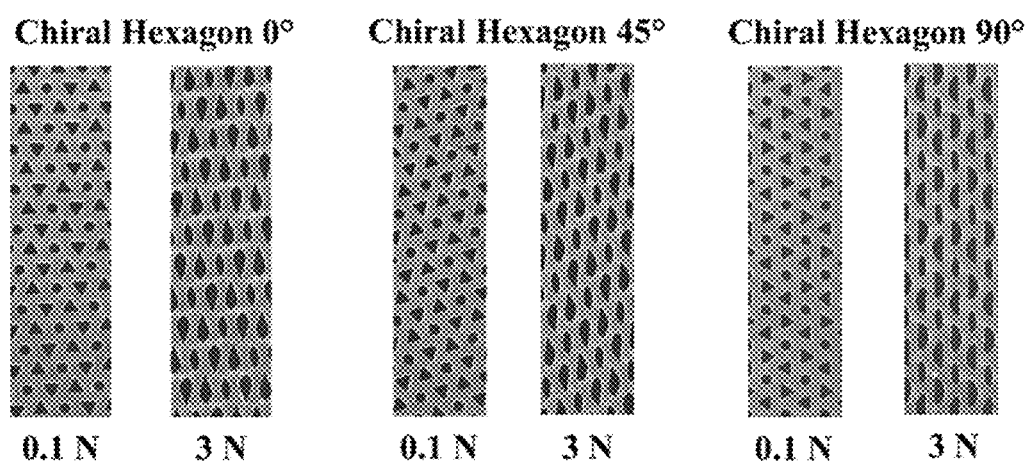
FIG. 15 shows images of the central regions of elastomeric auxetic membranes with pores having an exemplary chiral hexagon auxetic geometry loaded longitudinally from 0.1 N to 3 N and rotated at 0°, 45°, and 90° with respect to the longitudinal axis of the membranes

Synthetic membranes with the bowtie and chiral hexagon pore geometries at 0°, 45°, and 90° were manufactured (see FIGS. 14-15). Membranes were manufactured from polydimethylsiloxane (PDMS), an elastomer with a material stiffness (9.9 MPa) similar to that of a vagina. 3 N of force were applied along the longitudinal axis of the membranes. Quantitative measurements of the following parameters were used: minimal pore diameter, effective pore area (defined by the area of the pores with widths greater than 1 mm), porosity (defined by the amount of pore space within the membrane), effective porosity (defined by the amount of void space within the mesh from the pores that are greater than 1 mm), and relative lateral contraction (representative of the degree of contraction of the model with a positive value indicating model contraction (i.e., pore collapse) and a negative value indicating expansion (i.e., pores remaining open/enlarging)).

TABLE 2

| Geometry | Minimal Pore Diameter (% Change) | Effective Pore Area (% Change) | Porosity (% Change) | Effective Porosity (% Change) | Relative Lateral Contraction at 3N |
|---|---|---|---|---|---|
| Bowtie 0° | +13.6% | No change | +33.3% | +33.3% | −25.5% |
| Bowtie 45° | −49.0% | −100.0% | −27.4% | −100.0% | +14.4% |
| Bowtie 90° | +72.5% | No change | +33.6% | +33.6% | −30.9% |
| Chiral Hexagon 0° | −28.8% | N/A | +37.6% | N/A | −9.6% |
| Chiral Hexagon 45° | −26.4% | N/A | +38.1% | N/A | −10.5% |
| Chiral Hexagon 90° | +96.8% | N/A | +40.6% | N/A | −11.8% |

Regarding effective pore area, the effective pore area for all models was 100%. No change means that the effective pore area at 3 N was maintained at 100%. Regarding a result of "N/A," a parameter was not calculated.

As seen in Table 2 and FIG. 14, the minimal pore diameter, porosity, and effective porosity all increased for the bowtie 0° membranes while mesh burden decreased. There was no change in the effective pore area (i.e. the minimal pore diameter of pores was >1 mm). These results are similar to the results for bowtie 90° membranes in which the minimal pore diameter, porosity, and effective porosity all increased while mesh burden decreased and the effective pore area was unchanged. The observed pore collapse with the bowtie 45° membranes was associated with a decrease in the minimal pore diameter and porosity, and there was a complete loss (i.e. 100% decrease) in the effective pore area and effective porosity. Mesh burden however was increased for the bowtie 45° membranes, and this result was anticipated given that pore collapse results in an increased amount of material.

As seen in Table 2 and FIG. 15, the minimal pore diameter decreased for the chiral hexagon 0° and 45° membranes while it increased for the 90° membranes. The porosity for all of the chiral hexagon membranes increased while mesh burden decreased for all of them. The effective pore area and effective porosity was not calculated for the chiral hexagon membranes given that the minimal pore diameter for all pores within these membranes was less than 1 mm prior to the application of loading (this was a result of our manufacturing process). Thus, calculations of these two parameters would not accurately reflect how the effective pore area and effective porosity changes with loading and we therefore did not analyze these two parameters for the chiral hexagon membranes.

Collectively the results from this mechanical testing of the bowtie and chiral hexagon 0°, 45°, and 90° membranes demonstrate that auxetic pores have the ability to expand; however, expansion is dependent on the orientation of the pore with respect to the direction of loading.

It should be understood that modifications to the embodiments disclosed herein can be made to meet a particular set of design criteria. For instance, the number of or configuration of components or parameters may be used to meet a particular objective.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

It is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of the device and methods of making and using the same have been discussed and illustrated herein, it is to be distinctly understood that the invention is not limited thereto but may be otherwise variously embodied and practiced within the scope of the following claims, which is to be given the full breath thereof.

What is claimed is:

1. An elastomeric membrane for implantation in a human body, comprising:
    a plurality of fibers, comprised of at least one polymer; and
    a plurality of pores, wherein each pore is defined by the plurality of fibers and has an auxetic shape such that a size of the pores expands in a direction transverse to a longitudinal axis when the membrane is subject to a tensile load along the longitudinal axis,
    wherein the plurality of fibers have an original length and are configured to return to a second length after tensile loading or unloading at 15 N, wherein the second length is less than or equal to 40% longer than the original length.

2. The membrane of claim 1, wherein the at least one polymer is polycarbonate urethane.

3. The membrane of claim 1, wherein the plurality of fibers have a material stiffness that is similar to a native tissue to which the membrane is attached.

4. The membrane of claim 1, wherein the plurality of fibers have a material stiffness of 6 to 35 MPa.

5. The membrane of claim 1, wherein the at least one polymer is a combination of at least two different types of fibers.

6. The membrane of claim 1, wherein the at least one polymer is a combination of at least two different grades of a single type of polymer.

7. The membrane of claim 1, wherein the auxetic shape is a bowtie shape.

8. The membrane of claim 7, wherein the bowtie shape has horizontal edges and is oriented such that the horizontal edges are perpendicular to an axis of loading.

9. The membrane of claim 1, wherein the auxetic shape is a chiral hexagon shape.

10. The membrane of claim 1, wherein each pore has a minimum pore diameter of 0.5 to 5.0 mm.

11. The membrane of claim 1, wherein the membrane is manufactured using a technique that yields a membrane with no knots or interstices.

12. The membrane of claim 1, wherein the plurality of fibers have a width between 0.3 and 1 mm in an untensioned state.

13. The membrane of claim 1, wherein the plurality of fibers have a thickness between 0.3 and 1 mm in an untensioned state.

14. The membrane of claim 1, wherein the membrane has an effective pore area that does not change in response to a tensile load up to 15 N.

15. The membrane of claim 1, wherein the at least one polymer is non-biodegradable.

16. The membrane of claim 1, wherein the at least one polymer is bioresorbable.

17. The membrane of claim 1, wherein the at least one polymer is configured to interact with a native tissue to enhance tissue integration.

18. The membrane of claim 1, wherein the membrane comprises a body section and at least one arm section, wherein the at least one arm section extends outwardly from the body section.

19. The membrane of claim 1, wherein the membrane has a porosity greater than or equal to 75%.

* * * * *